UNITED STATES PATENT OFFICE.

MAURICE CERESOLE, OF NEUVILLE, FRANCE, ASSIGNOR TO THE BADISCHE ANILIN AND SODA FABRIK, OF LUDWIGSHAFEN, GERMANY.

RED DYE-STUFF.

SPECIFICATION forming part of Letters Patent No. 456,081, dated July 14, 1891.

Application filed July 8, 1890. Serial No. 358,078. (No specimens.) Patented in Germany February 1, 1889, No. 48,731, and in France February 12, 1889, No. 186,697.

*To all whom it may concern:*

Be it known that I, MAURICE CERESOLE, doctor of philosophy, a citizen of the Swiss Republic, residing at Neuville, in the Department of the Rhône, France, have invented new and useful Improvements in the Manufacture of a New Red Dye-Stuff of the Rhodamine Class, (for which Letters Patent have been obtained with my consent in Germany, Patent No. 48,731, dated February 1, 1889, and in France, Patent No. 186,697, dated February 12, 1889,) of which the following is a specification.

This invention relates to the manufacture of a new red coloring-matter or dye-stuff belonging to that class of phthaleins known as "rhodamines."

The dye-stuff which forms the subject-matter of this present application for Letters Patent is an alkylized rhodamine produced by the condensation of one molecule of phthalic anhydride with two molecules of monoethyl-meta-amidophenol. The said monoethyl-meta-amidophenol, an alkyl derivative of the known meta-amido-phenol, was unknown before the date of this invention, but may be obtained from monoethylmeta-amidobenzenesulpho-acid, which results from the action of the ethyl-halogen compounds on metanilic acid under pressure, or may be produced by directly sulphonating monoethyl-aniline with fuming sulphuric acid. Thus, for instance, mix about ten (10) parts (by "parts" throughout this specification are meant parts by weight) of monoethyl-aniline gradually with about twenty (20) parts of fuming sulphuric acid containing, say, about twenty-three (23) per cent. of free anhydride ($SO_3$) and keep the temperature throughout the operation below sixty degrees centigrade, (60° C.) Next add about thirty (30) parts of fuming sulphuric acid containing, say, about seventy-five (75) per cent. of free anhydride, still fulfilling the same conditions as to temperature. Allow the mixture to stand at a temperature of about forty degrees centigrade (40° C.) until a test portion yields with alkaline water a clear solution, or nearly so. This point being arrived at, pour the whole mass into water and work up the sulpho-acid into its sodium salt in the usual way. To convert the dry sodium salt into monoethylmeta-amidophenol, melt about ten (10) parts thereof with about twenty-five (25) parts of caustic potash for about ten hours at a temperature of about two hundred to two hundred and twenty degrees centigrade, (200° to 220° C.) It is advantageous to avoid as far as possible the access of air to the melt. Dissolve the mass when cold in water, acidify with hydrochloric acid, and filter to free from insoluble impurities. Add sufficient sodium carbonate to render the solution alkaline, extract the monoethylmeta-amido-phenol thus set free with ether or benzine, and distill off the solvent in the usual way. The monoethylmeta-amidophenol thus obtained, after purification by distillation, solidifies gradually to a compact light yellow mass, and can be recrystallized from a mixture of benzine and ligroine, when it is obtained in colorless feather-like crystals which melt at a temperature of about sixty-two degrees centigrade, (62° C.) It is slightly soluble in cold water, very readily soluble in alcohol, benzine, and ether, and scarcely soluble in ligroine.

Now, to carry out this invention and to obtain the new red dye-stuff, mix together about ten (10) parts of monoethylmeta-amidophenol, about ten (10) parts of phthalic anhydride, and about five (5) parts of zinc chloride in an enameled vessel and, while excluding air as far as possible, melt at a temperature of about one hundred and seventy to one hundred and eighty degrees centigrade, (170 to 180° C.) Stir continuously and maintain this temperature until the melt shows a tendency to solidify. This point being arrived at, allow the mass to cool and then reduce it to a fine powder and wash repeatedly with water to extract the zinc chloride as perfectly as possible. Next stir it well into about two hundred (200) parts of water and digest for twenty-four hours with about fifty (50) parts of ammonia-liquor of 0.92 specific gravity, first cold, but later heating the mixture. The dye-stuff base separates out in the crystalline form; filter, wash, and dry. To convert this into the commercial form of its more soluble hydrochloride, dissolve it in boiling very dilute hydrochloric acid, filter, and allow the dye-stuff to crystallize out. The new red dye-stuff thus obtained is chemically symmetrical diethyl-rhodamine in the form of a basic hydrochloride. The constitution of the free base can be represented by the formula:

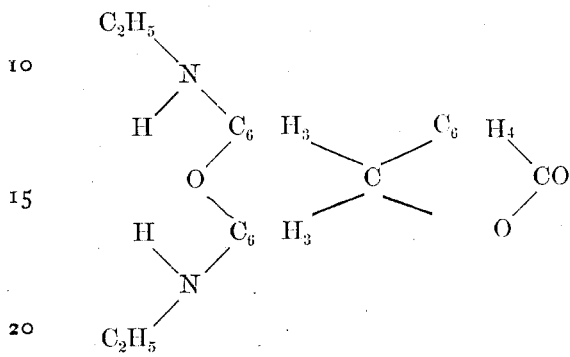

By the above method the said hydrochloride is obtained in the form of small bluish-red needles with a metallic green luster or of a crystalline brownish-red powder. It is readily soluble in alcohol, yielding a yellowish red intensely flourescent solution. In benzine it is practically insoluble. In concentrated hydrochloric acid it dissolves with an orange-yellow color. The solution in concentrated sulphuric acid is pure yellow in color. It differs from the known tetraethyl and tetramethyl rhodamines in the following properties: It is less soluble in cold water, and the solution is reddish-yellow in color with a greenish-yellow fluorescence instead of bluish-red with an orange fluorescence. On standing, the solution soon dissociates and a separation of the base in glittering crystals takes place. Hot water dissolves the salt more readily without immediate separation of the base, but on cooling this partially crystallizes out. The solutions of the known rhodamines are, as is well known, stable.

The free base of the dye-stuff can be obtained by adding a caustic alkali to a hot aqueous solution when it separates out as a bluish-red crystalline powder or in plates. It is only very slightly soluble in water, alcohol, benzine, and ether, but wood-spirit dissolves it easily and yields a red solution with intensely greenish-yellow fluorescence.

The new dye-stuff dyes wool and silk without the aid of a mordant yellowish-red shades, the dyed silk exhibiting striking fluorescence. Cotton mordanted with tannin and tartar emetic may be dyed with my basic coloring-matter after the manner practiced for basic aniline colors. A small portion of diluted hydrochloric acid may be added to the dye-bath. All the shades are of a yellower tint than those obtained with the above-mentioned known rhodamines.

What I claim as new, and desire to secure by Letters Patent, is—

The new dye base symmetrical diethyl-rhodamine derived from monoethylmeta-amidophenol and phthalic anhydride, which is a bluish-red crystalline powder slightly soluble in water, alcohol, ether, and benzine, readily soluble in wood spirit with greenish fluorescence forming a basic hydrochloride readily soluble in alcohol with intense green-yellow fluorescence, soluble in strong hydrochloric and sulphuric acids, and slightly soluble in water with subsequent decomposition and separation of the base.

In testimony whereof I have hereunto set my hand in the presence of two subscribing witnesses.

M. CERESOLE.

Witnesses:
 EDM. B. FAIRFIELD,
 H. APPALES.